US009006950B2

(12) United States Patent
Matt et al.

(10) Patent No.: US 9,006,950 B2
(45) Date of Patent: Apr. 14, 2015

(54) SYNCHRONOUS ROTARY ELECTRIC MACHINE HAVING A DOUBLE EXCITATION ROTOR

(75) Inventors: Jean-Claude Matt, Dijon (FR); Jean-Claude Mipo, Creteil (FR); Li Li, Viroflay (FR); Albert Foggia, Grenoble (FR)

(73) Assignee: Valeo Equipements Electriques Moteur, Créteil Cedex (FR)

( * ) Notice: Subject to any disclaimer, the term of this patent is extended or adjusted under 35 U.S.C. 154(b) by 299 days.

(21) Appl. No.: 13/810,619

(22) PCT Filed: Jul. 11, 2011

(86) PCT No.: PCT/FR2011/051642
§ 371 (c)(1),
(2), (4) Date: Mar. 8, 2013

(87) PCT Pub. No.: WO2012/013885
PCT Pub. Date: Feb. 2, 2012

(65) Prior Publication Data
US 2013/0169095 A1  Jul. 4, 2013

(30) Foreign Application Priority Data

Jul. 29, 2010 (FR) ..................... 10 56239
Jul. 29, 2010 (FR) ..................... 10 56245
Oct. 26, 2010 (FR) ..................... 10 58755

(51) Int. Cl.
*H02K 1/00* (2006.01)
*H02K 21/04* (2006.01)
(Continued)

(52) U.S. Cl.
CPC .............. *H02K 21/042* (2013.01); *H02K 21/38* (2013.01); *H02K 1/223* (2013.01)

(58) Field of Classification Search
USPC ................. 310/181, 156.53, 156.57, 191
See application file for complete search history.

(56) References Cited

U.S. PATENT DOCUMENTS

| 3,601,641 | A  | * | 8/1971 | Baermann ................. 310/93 |
| 2007/0090713 | A1 | * | 4/2007 | Arita et al. ................ 310/181 |
| 2010/0207480 | A1 | * | 8/2010 | Reutlinger ................. 310/181 |

FOREIGN PATENT DOCUMENTS

| EP | 0 932 245 | 7/1999 |
| FR | 2 780 580 | 12/1999 |

(Continued)

OTHER PUBLICATIONS

Amara Y et al, "A New Topology of Hybrid Synchronous Machine", Industry Applications Conference, vol. 1, Oct. 8, 2000-Oct. 12, 2000, pp. 451-456.

(Continued)

*Primary Examiner* — Hanh Nguyen
(74) *Attorney, Agent, or Firm* — Berenato & White, LLC

(57) ABSTRACT

A machine (1) having a rotor (11) including permanent magnets (PM) and field coils (EC). The magnets are housed in first axial recesses (E1) distributed in a circumferential portion of the magnetic body, thus defining circumferential polar sections. The coils are housed in second axial recesses (E2) distributed in an intermediate portion of the magnetic body and defining polar teeth (RT). The circumferential polar section includes a third recess (E3) having a maximum width at the top thereof, and the ratio of the maximum width of the third recess to a pole width of the circumferential polar section has a value of around 0.13 mm to around 0.44 mm.

11 Claims, 4 Drawing Sheets

(51) Int. Cl.
*H02K 1/22* (2006.01)
*H02K 21/38* (2006.01)

(56) References Cited

FOREIGN PATENT DOCUMENTS

| WO | WO 2004/017496 | 2/2004 |
| WO | WO 2007/026717 | 3/2007 |
| WO | WO 2009/026767 | 3/2009 |

OTHER PUBLICATIONS

Li Li et al, "Some Armature Reaction Compensation Methods . . . ", Electric Machines and Drives Conference, 2009, May 3, 2009-May 3, 2009, pp. 832-838.

\* cited by examiner

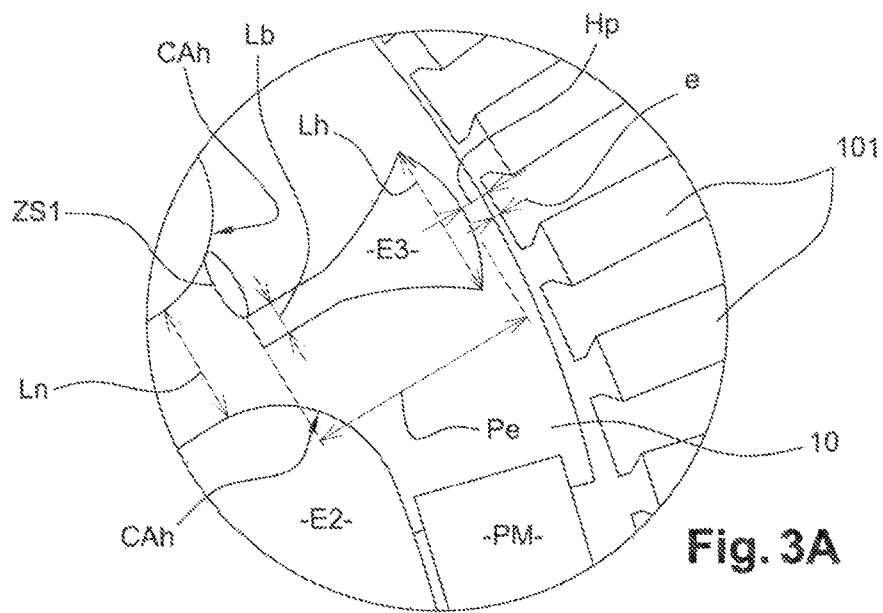
Fig. 3A
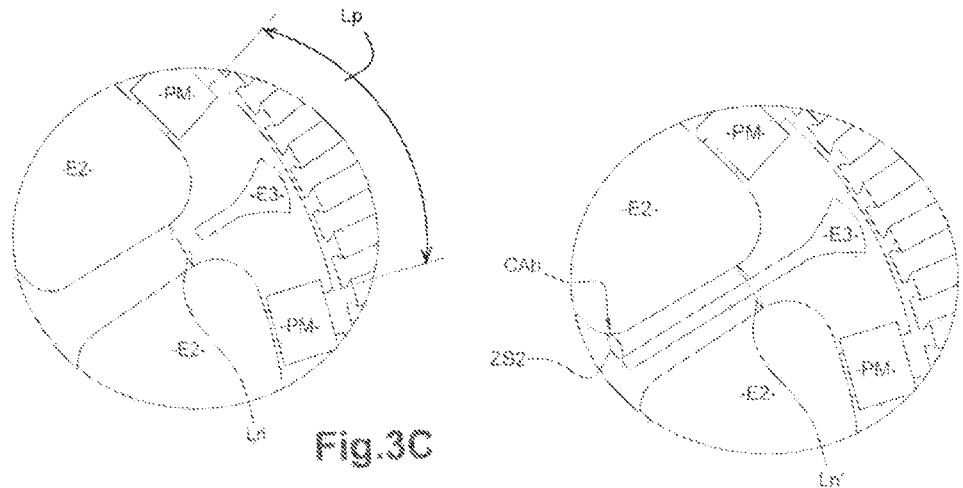
Fig. 3C
Fig. 3B

SYNCHRONOUS ROTARY ELECTRIC MACHINE HAVING A DOUBLE EXCITATION ROTOR

CROSS-REFERENCE TO RELATED APPLICATIONS AND CLAIM TO PRIORITY

This application is a national stage application of International Application No. PCT/FR2011/051642 filed Jul. 11, 2011, which claims priority to French Patent Application Nos. 10/56245 filed Jul. 29, 2010, 10/56239 filed Jul. 29, 2010, and 10/58755 filed Oct. 26, 2010, of which the disclosures are incorporated herein by reference and to which priority is claimed.

The present invention relates to a synchronous rotary electric machine having a rotor equipped with permanent magnets and a field coil. More particularly, the invention relates to a machine of this type for applications such as generator and/or electric traction motor in electric and hybrid motor vehicles.

Due to their increased performances in terms of specific and volume power output, synchronous permanent magnet machines today find a broad application in the field of motor vehicles. Moreover, the availability of rare earth permanent magnets on a large-scale with acceptable economic conditions makes the choice of these electric machines viable for the new generations of motor vehicles.

These electric machines can be produced in a wide range of power and speed and find application in both vehicles of the "all electric" type as well as in low $CO_2$ emission vehicles of the types known as "mild-hybrid" and "full-hybrid".

The "mild-hybrid" applications generally relate to electric machines of about 8-10 KW, for example, an electric motor mounted on the front face of an internal-combustion engine and coupled to the latter by a drive belt. It is possible with such an electric motor to reduce the cubic capacity of the internal-combustion engine ("engine downsizing") by supplying electric assistance in torque which provides extra power especially when accelerating. Moreover, low speed traction, for example in an urban environment, can also be assured by this same electric motor. Applications of the "full-hybrid" type generally relate to motors of 30-50 KW in series and/or parallel type arrangements with a more successful level of incorporation of the electric motor(s) in the drive train of the vehicle.

However, electric machines with excitation only by permanent magnets present de-fluxing difficulties. Otherwise, in a motor vehicle, when the electric machine is used as a traction motor in various traffic situations of the vehicle, the latter must be able to operate under variable load and speed conditions and therefore must be able to be de-fluxed to reach the zone of high-speeds.

Machines having double excitation can be de-fluxed more easily and offer the possibility of combining, in their rotor, an increased energy density provided by the permanent magnets and a capacity to control the magnetic flux in the air-gap provided by the field coil.

An interesting structure of a machine having double excitation is disclosed in the article of Li Li et al. entitled "Some armature reaction compensation methods, numerical design of experiments and optimization for a hybrid excitation machine" and published in IEMDC, Miami, USA (2009).

The present invention proposes a synchronous rotary electric machine having double excitation with rotor topology of the type disclosed in the above article and the design of which has been optimized in order to increase the performances and the interest of these machines for the automotive industry.

According to a first aspect, the present invention relates to a rotary electric machine having double excitation, including a stator equipped with stator coils and a rotor comprising a plurality of alternate north poles and south poles, which are formed from a plurality of permanent magnets and a plurality of field coils. The permanent magnets are housed in respective first recesses extending axially and regularly distributed within a circumferential portion of the magnetic body of the rotor so as to define a plurality of circumferential polar sections. The field coils are housed in respective second recesses extending axially and distributed regularly within an intermediate portion of the magnetic body of the rotor, the intermediate portion being located between the circumferential portion and a central portion of the rotor. Each field coil is inserted in a respective radial polar tooth forming a partition between two second consecutive recesses, each polar tooth being substantially aligned on a central radial axis of the corresponding pole.

In accordance with the invention, at least one circumferential polar section includes a third recess substantially aligned on the central radial axis and having a maximum width at a top of the latter and a minimum width at a foot of the latter, the foot being the end of the third recess nearest to a central part of the rotor, and the ratio of the maximum width of the third recess to a pole width of the circumferential polar section has a value of around 0.13 to around 0.44.

According to another particular feature, the maximum width of the third recess has a value of around 2 mm to around 10 mm.

Preferably, to obtain the combined effect of an increase in torque and a reduction in inertia, the ratio of the maximum width of the third recess to a pole width of the circumferential polar section has a value of around 0.22 to around 0.29 and said maximum width of the third recess has a value of around 4 mm to around 6.5 mm.

According to another particular feature of the invention, the minimum width of the third recess is between around 0.8 times a minimum air-gap width of the machine and around 1.2 times the minimum air-gap width.

According to yet another particular feature of the invention, the circumferential polar section including the third recess includes, between the top of the third recess and an outer polar face, a portion of the magnetic body forming a bridge having a height of around 0.7 mm to around 2 mm.

According to one particular embodiment of the invention, the third recess extends in the polar tooth. For example, the third recess can extend substantially over the entire height of the polar tooth. The third recess could advantageously be implemented in a widened form.

According to still another particular feature of the invention, a ratio of the polar tooth width to the permanent magnet height is between around 0.65 and around 1.

The inventive rotary electric machine can advantageously be formed as an electric motor, generator or motor/generator for motor vehicles.

Other features and advantages of the invention will become evident on reading the following description of several particular forms of embodiment, with reference to the figures below, wherein:

FIGS. 3A, 3B and 3C are partial views in cross-section of the rotor of the machine showing two different forms of embodiment and dimensioning parameters, for a recess of substantially widened form provided within a circumferential portion of the magnetic body of the rotor;

Figure 1:
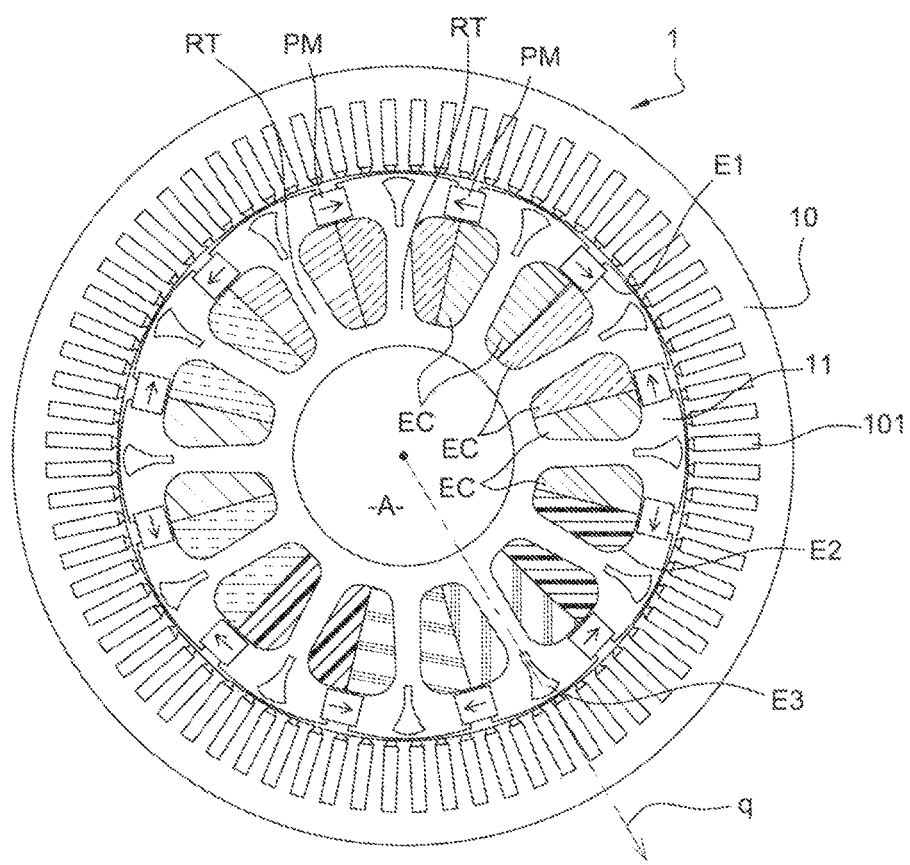
FIG. 1 is a view in cross section showing, in a simplified way, the structure of a particular form of embodiment of a rotary electric machine having double excitation according to the invention.

FIG. 1 shows the structure of a particular embodiment 1 of a rotary electric machine having double excitation according to the invention which includes a stator 10 and a rotor 11. Rotor 11 of machine 1 comprises a plurality of alternate north and south projecting poles, which are formed from a plurality of permanent magnets PM and a plurality of field coils EC.

A specific embodiment of such a machine according to the invention is for example a motor/generator of 8-10 KW for applications in motor vehicles of the type known as "mild-hybrid". In its motor operating mode, such a machine can be designed for starting the internal-combustion engine, assistance in torque of the internal-combustion engine as well as low speed electric traction of the vehicle. In its generator operating mode the machine can function in normal alternator mode or regenerative braking mode.

One particular form of embodiment of this machine includes a stator 10 having 72 notches 101 and a rotor 11 comprising 12 alternate north and south poles. Rotor 11 has a diameter of about 100 mm and an axial length of about 50 mm. Rotor 11 comprises 12 permanent magnets PM having a substantially rectangular form with dimensions: length× height×width=50 mm×5 mm×6 mm.

Stator 10 and rotor 11 are constructed in a conventional manner with sheet metal packets forming magnetic bodies.

Notches 101 of stator 10 are designed to receive stator coils (not illustrated) and, between them, form a plurality of stator teeth. According to the forms of embodiment, notches 101 will be designed to house concentrated coils, wound on large teeth or distributed coils.

Rotor 11 has the general form of a multi-lobed cylinder, each of the lobes corresponding to a magnetic pole of the rotor.

Magnets PM are disposed in a buried way within the circumferential portion of rotor 11 and extend axially over the entire length of rotor 11. Magnets PM are housed in respective recesses E1 and are distributed within the circumferential portion of rotor 11 in such a way that two consecutive magnets PM, in circumferential direction, are disposed with different polar orientations, as shown on FIG. 1. For example, if PM1 and PM2 are consecutive magnets, the respective polar orientations could be N-S and S-N or S-N and N-S, still in the same circumferential direction.

Magnets PM are preferably permanent magnets composed of rare earths such as magnets of the Neodymium-Iron-Boron (NeFeB), Samarium-Iron (SmFe), Samarium-Cobalt (SmCo) type or magnets made from sintered or bound ferrites.

Rotor 11 has a central bore emerging at its two facial ends and intended to receive its drive shaft A. It will be noted that in the present invention shaft A could be implemented in a magnetic material.

Apart from the recesses E1 containing the magnets PM, rotor 11 also comprises recesses E2 and E3 which are repeated for each pole and extend axially over substantially the entire length of the rotor.

The recesses E2 are designed to house field coils EC in rotor 11. The recesses E2 are located under magnets PM, with as many recesses E2 as magnets PM. Two consecutive recesses E2 are separated by a radial partition forming polar tooth RT, around which a corresponding field coil EC is wound. The field coils EC can be electrically connected in series, parallel or parallel/series arrangements.

The recesses E3 fulfill several functions. In a general way, they primarily have the function of contributing to controlling the magnetic flux and reducing the inertia of the rotor. Depending on the applications, the recesses E3 will need to be optimized by simulations on the magnetic field lines so as to find the best possible compromise between minimum inertia of the rotor and maximum torque delivered by the machine in motor mode. The recesses E3 could also be optimized so as to improve the behaviour of the machine in respect to the magnetic reaction of the armature.

It will be noted that certain recesses E2 could advantageously be used for tie-rods of rotor 11.

In this form of embodiment, the recesses E3 contain air. For certain applications, they could be filled with non-magnetic materials, even magnetic materials but with low density. The recesses E3 here are substantially radially arranged in rotor 11, between two consecutive magnets PM and aligned on a central radial axis of the pole, this axis conventionally designated "axis q".

Figure 2A:
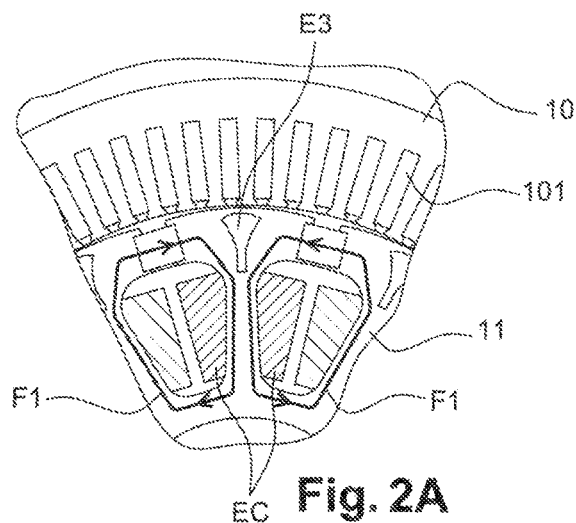
FIGS. 2A and 2B are partial views in cross-section of the rotor of the machine showing the double excitation operation.
Figure 2B:
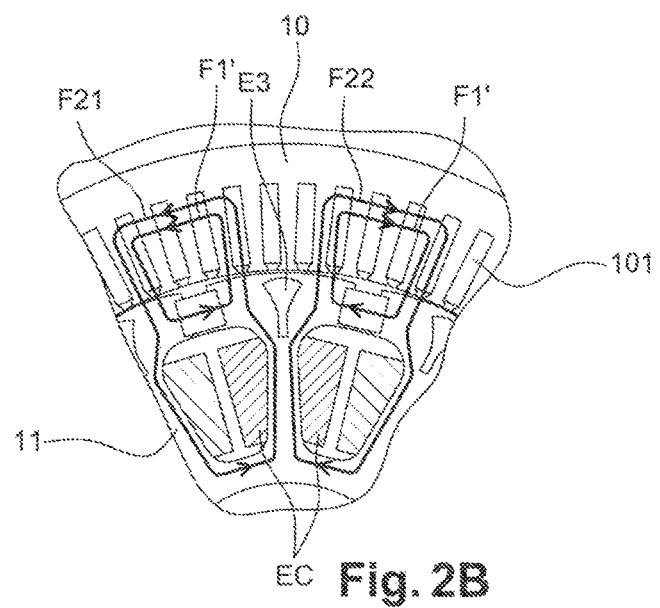

Referring to FIGS. 2A and 2B, operation of the double excitation at a pole of rotor 11 is now described, in the knowledge that this operation is identical for all the poles of rotor 11.

FIG. 2A shows the case where the field coil EC is not excited, signifying that it does not conduct excitation current. As shown on FIG. 2A, magnetic fluxes F1 generated by permanent magnets PM then pass through the magnetic body of rotor 11. The reluctance of the magnetic circuits of rotor 11 must naturally be determined in order to avoid any demagnetization of permanent magnets PM. In this operating mode, given that the magnetic fluxes F1 do not flow through stator 10, this means that no electromotive force (e.m.f.) is produced in the stator coils.

FIG. 2B shows the case where the field coil EC is excited, signifying that it conducts excitation current. The schematic illustration of FIG. 2B corresponds to the case where the excitation current flowing through coil EC has an intensity such that the magnetic fluxes generated by magnets PM are entirely constrained to circulating through stator 10 (magnetic fluxes F1'). The excitation current flowing though coil EC causes the appearance of an additional magnetic flux at the corresponding polar tooth RT. This additional flux is subdivided into two parts F21 and F22 which pass on either side of recess E3 and then circulate in stator 10. As shown on FIG. 2B, the passage of fluxes F21 and F22 towards the polar tooth RT concerned takes place through the adjacent polar teeth RT, located on either side of that concerned.

Referring to FIGS. 3A, 3B and 3C, recess E3 is now described in a more detailed manner.

As shown on FIGS. 3A, 3B and 3C, in this form of embodiment, recess E3 has a substantially widened form. The widened portion is located within the circumferential portion of rotor 11.

Naturally those forms other than this widened form are possible for recess E3 and remain within the scope of this invention, the widened form described here only being given as an example embodiment.

The parameters below must be taken into account to define recess E3, namely:

Lb which is the minimum width of recess E3 at a foot of the latter;

Hp which is the sheet metal height between the top of recess E3 and the outer face of the corresponding pole, height Hp designated "bridge height" below;

Pe which is the depth of recess E3;

Lh which is the maximum width of recess E3 at a top of the latter;

Ln which is the width of polar tooth RT; and

Lp which is the width of the pole, measured on the outer circumference of rotor 11.

Simulations and tests implemented by the inventive entity have shown that the recess minimum width parameter Lb must be determined as function of the air-gap width between rotor 11 and stator 10. In the forms of embodiment described here, the air-gap between rotor 11 and stator 10 is variable on account of the multi-lobed structure of rotor 11. The air-gap width e (shown on FIG. 3A) is the minimum width of the air-gap, that is to say, the air-gap width at axis q. It will be noted here that the variability of the air-gap contributes to reducing the harmonics and thus the iron losses.

The inventive entity has shown that the minimum width of recess Lb must remain substantially equivalent to the air-gap width e. Indeed, too high a width Lb leads to magnetic saturation of the pole and, consequently, to a decrease in mechanical torque. Preferably, the minimum width of recess Lb must be around 0.8 times the air-gap width e (0.8×e) to around 1.2 times the air-gap width e (1.2×e).

The bridge height Hp must be minimized to obtain magnetic saturation which, by preventing the magnetic flux along axis q, entails an increase in torque. The reduction of height Hp is also favourable to a significant decrease in inertia. Given that inertia is proportional to the square of the radius, any decrease of mass furthest away possible from the centre of the rotor is very favourable to the decrease in inertia. However, this bridge height Hp must be dimensioned so that the bridge can withstand the mechanical stresses to which the rotor is subjected, in particular centrifugal force. The bridge height Hp therefore cannot be less than a minimum value which is imposed by these mechanical stresses. Tests implemented by the inventive entity have shown that a bridge width Hp of around 0.7 mm to around 2 mm is a good compromise.

Concerning the depth Pe of recess E3, FIGS. 3A, 3C and 3B show two possible forms of embodiment.

In the form of embodiment on FIGS. 3A, 3C, the bottom of the foot of recess E3 is located at a high rounded corner CAh of recess E2. For certain applications, saturation zones ZS1 between the bottom of the foot of recess E3 and the high rounded corner CAh of recess E2 could be dimensioned so as to control the magnetic flux.

In the form of embodiment on FIG. 3B, recess E3 extends substantially over the entire height of polar tooth RT. The bottom of the foot of recess E3 is located at a low rounded corner CAb of recess E2. Similarly to the form of embodiment on FIGS. 3A, 3C, saturation zones ZS2 between the bottom of the foot of recess E3 and the high rounded corner CAb of recess E2 could be dimensioned in order to control the magnetic flux. Here it will be noted that the width Ln' of polar tooth RT will be greater than that Ln of the form of embodiment on FIGS. 3A, 3C to retain the same magnetic body width for tooth RT.

In accordance with the invention, the maximum width Lh of recess E3 is dimensioned as function of Lp which is the width of the pole measured on the outer circumference of rotor 11 (as shown on FIG. 3C), so as to optimize the compromise between inertia and torque.

Figure 4:
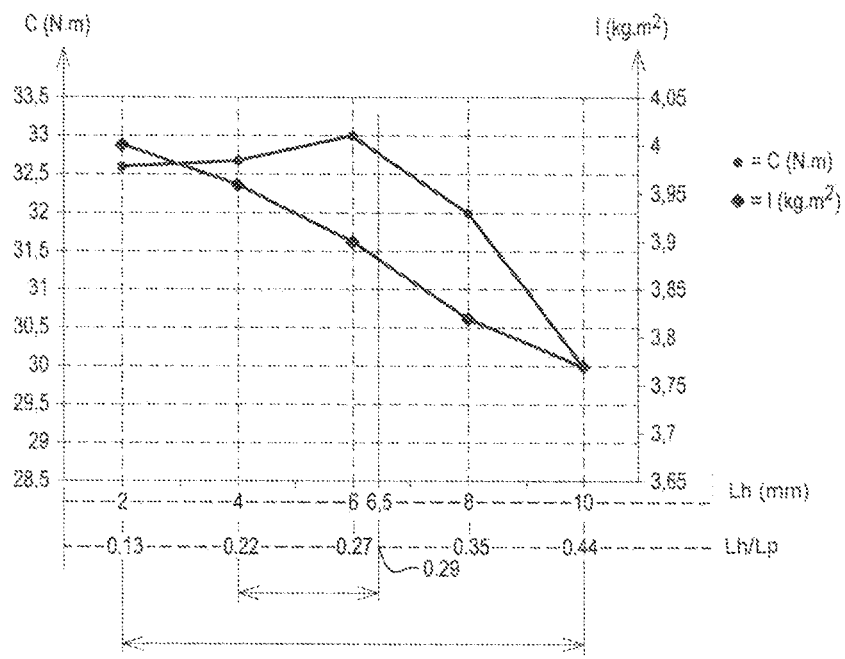
FIG. 4 shows torque C and inertia I curves as function of a maximum recess width Lh and a polar tooth width Ln.
Figure 5:
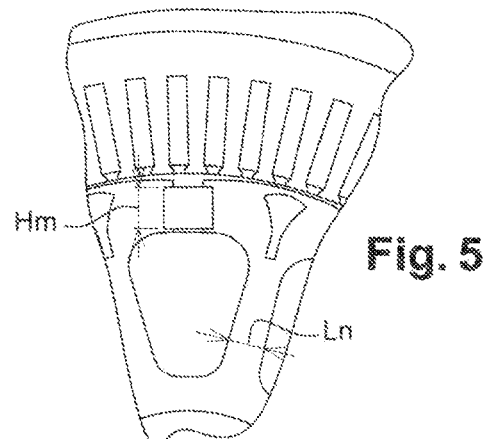
FIG. 5 is a partial view in cross-section of the rotor of the machine wherein the width Ln of the polar teeth and a height Hm of the permanent magnets; are defined.

FIG. 4 shows torque C and inertia I curves as function of the ratio Lh/Lp and maximum recess width Lh. The torque curve is illustrated with points in the form of a circle. The inertia curve is illustrated with points in the form of a rhombus.

From a study of these curves, it is evident that a good compromise between inertia and torque can be found for values Lh/Lp of around 0.13 to around 0.44. Values Lh of around 2 to around 10 mm give good results. It will be noted that for values Lh/Lp and Lh between 0.22 and 0.29 and 4 and 6.5 mm respectively, it is possible to reduce inertia and increase torque at the same time. Taking into account the teaching provided above by the inventive entity, the person skilled in the art will choose, in the given intervals, the values Lh/Lp and Lh best adapted to the application considered.

Figure 6:
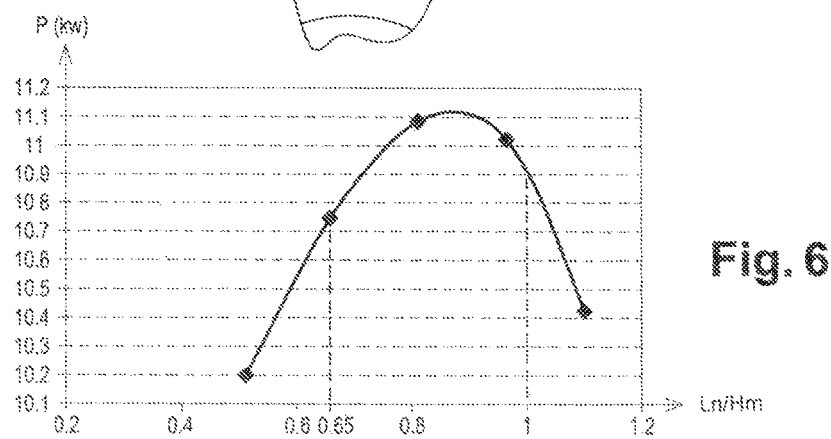
FIG. 6 is a power curve of the machine as function of a ratio Ln/Hm of the polar tooth width to the permanent magnet height.

Referring to FIGS. 6 and 7, optimization proposed by the inventive entity of the ratio between the width Ln of polar teeth RT and the height Hm of permanent magnets PM is now discussed. Tests and simulation implemented by the inventive entity have shown that this is a critical point for dimensioning the machine, which has a substantial influence on the power of the latter.

A compromise must be found between the percentage of magnetic flux produced by the permanent magnets and that produced by the field coil, in other words, between the permanent magnets and the quantity of copper incorporated in the rotor. The parameter Hm here is representative of the magnetic flux generated by the magnets. The parameter Ln is related to the quantity of copper in the rotor and thus to the magnetic flux generated by the field coil. Indeed, according to the width Ln of the polar teeth, it will be possible to incorporate more or less copper in the recesses E2. Moreover, the width Ln has to be dimensioned carefully so as to avoid, on the one hand, insufficient pull of the magnetic body of polar tooth RT at an operating point of the magnetic circuit which is too far away from magnetic saturation and, on the other hand, excessive saturation of the magnetic body of the polar tooth RT which would limit the passage of the magnetic flux generated by the field coil.

The curve on FIG. 7, plotted by the inventive entity, indicates power P of the machine as function of the value of the ratio Ln/Hm. A ratio Ln/Hm of around 0.65 to around 1 has proved to be a good compromise and guarantees the performances of the machine.

The invention claimed is:

1. Rotary electric machine having double excitation including a stator (10) equipped with stator coils and a rotor (11) comprising a plurality of alternate north poles and south poles which are formed from a plurality of permanent magnets (PM) and a plurality of field coils (EC), said permanent magnets (PM) being housed in respective first recesses (E1) extending axially and distributed regularly within a circumferential portion of the magnetic body of said rotor (11), so as to define a plurality of circumferential polar sections, said field coils (EC) being housed in respective second recesses (E2) extending axially and distributed regularly within an intermediate portion of the magnetic body of said rotor (11), said intermediate portion being located between said circumferential portion and a central portion (A) of said rotor (11), each said field coil (EC) being inserted in a respective radial polar tooth (RT) forming a partition between two said consecutive second recesses (E2), each polar tooth (RT) being substantially aligned on a central radial axis (q) of the corresponding pole, wherein at least one said circumferential polar section includes a third recess (E3) substantially aligned on said central radial axis (q) and having a maximum width (Lh) at a top of the latter and a minimum width (Lb) at a foot of the latter, said foot being the end of the third recess (E3) nearest to a central part (A) of said rotor, and the ratio (Lh/Lp) of said maximum width (Lh) of said third recess (E3) to a pole width (Lp) of said circumferential polar section has a value of around 0.13 to around 0.44.

2. Rotary electric machine according to claim 1, characterized in that said maximum width (Lh) of said third recess (E3) has a value of around 2 mm to around 10 mm.

3. Rotary electric machine according to claim 2, characterized in that said ratio (Lh/Lp) of said maximum width (Lh) of said third recess (E3) to a pole width (Lp) of said circumferential polar section has a value of around 0.22 to around 0.29 and said maximum width (Lh) of said third recess (E3) has a value of around 4 mm to around 6.5 mm.

4. Rotary electric machine according to claim 3, characterized in that said minimum width (Lb) of said third recess (E3) is between around 0.8 times a minimum air-gap width (e) of the machine and around 1.2 times said minimum air-gap width.

5. Rotary electric machine according to claim 4, characterized in that said circumferential polar section including said third recess (E3) includes, between said top of said third recess (E3) and an outer polar face, a magnetic body portion forming a bridge having a height (Hp) of around 0.7 mm to around 2 mm.

6. Rotary electric machine according to claim 5, characterized in that said third recess (E3) extends in said polar tooth (RT).

7. Rotary electric machine according to claim 6, characterized in that said third recess (E3) substantially extends over the entire height of said tooth polar (RT).

8. Rotary electric machine according to claim 7, characterized in that said third recess (E3) has a widened form.

9. Rotary electric machine according to claim 8, characterized in that a ratio (Ln/Hm) of the polar tooth width (Ln) to the permanent magnet height (Hm) is between around 0.65 and around 1.

10. Rotary electric machine according to claim 9, characterized in that it is implemented in the form of an electric motor for motor vehicles.

11. Rotary electric machine according to claim 10, characterized in that it is implemented in the form of an electric generator or motor/generator for motor vehicles.

* * * * *